United States Patent [19]
Ito

[11] 3,707,890
[45] Jan. 2, 1973

[54] HYDRAULIC CONTROL SYSTEM FOR TRANSMISSIONS

[75] Inventor: Shin Ito, Toyota, Japan

[73] Assignee: Toyota Jidosha Kogyo kabushiki Kaisha, Toyota-shi, Japan

[22] Filed: Feb. 10, 1971

[21] Appl. No.: 114,142

[30] Foreign Application Priority Data

Feb. 12, 1970 Japan ..................................45/11480

[52] U.S. Cl. ..................................................74/868
[51] Int. Cl. ..................................................B60k 21/00
[58] Field of Search ........................................74/868

[56] References Cited

UNITED STATES PATENTS 3,572,177   3/1971   Ishihara..................................74/868

*Primary Examiner*—C. J. Husar
*Attorney*—John J. McGlew and Alfred E. Page

[57] ABSTRACT

A hydraulic control system, for transmissions in which the high speed range is obtained by supplying oil under pressure into a first hydraulic servo while discharging the oil from a second hydraulic servo, and the low speed range is obtained by supplying oil under pressure to the second hydraulic servo while discharging oil from the first hydraulic servo, includes a source of hydraulic fluid under pressure, a pressure regulator valve, a governor valve, a throttle valve, a shift valve an orifice, an orifice control valve and an accumulator. The shift valve is connected to the source of regulated pressure and to exhaust, and directly controls supply and exhaust fluid relative to the first servo. The shift valve is connected through a passage having a flow restricting orifice therein to the second servo, and is also connected to the orifice control valve, which latter is in communication with the second servo. The orifice control valve has a first position blocking direct communication between the shift valve and the second servo and a second position bypassing the flow restricting orifice and establishing direct communication between the shift valve and the second servo. The orifice control valve is subjected to the throttle pressure and the pressure in the first hydraulic servo, acting in opposition. When shifting from low speed to high speed, the orifice control valve has its second position so that the pressure in the second servo is slowly decreased while the pressure in the first servo is rapidly increased. The increased pressure in the first servo moves the orifice control valve to its second position so that pressure is rapidly exhausted from the second servo after the pressure in the first servo has attained a predetermined value. In shifting from high speed to low speed, oil is rapidly discharged from the first servo to rapidly decrease the pressure therein, with the orifice control valve initially occupying its second position so that the pressure in the second servo is rapidly increased. As the pressure in the first servo decreases, the orifice control valve is moved, by the throttle pressure, back to its first position to decrease the rate of increase of the pressure in the second servo.

6 Claims, 8 Drawing Figures

INVENTOR
SHIN ITO

BY McBlew + Tuttle
ATTORNEY

INVENTOR
SHIN ITO

BY McBlew + Tuttle
ATTORNEY

HYDRAULIC CONTROL SYSTEM FOR TRANSMISSIONS

BACKGROUND OF THE INVENTION

This invention relates to a hydraulic control system for transmissions of vehicles such as automobiles, consisting of a variable ratio speed change gear, at least two friction engaging members for shifting the speed change gear and hydraulic servos for operating the members.

In this type of transmission, a plurality of shift valves are provided in order to supply operating hydraulic oil into or discharge it from the hydraulic servos. In the case of an automatic transmission, these shift valves are controlled by a signal proportional to the vehicle velocity and a signal proportional to the throttle opening. In the case of semi-automatic transmissions, these shift valves are indirectly opened or shut off by means of the manual changeover by a vehicle driver or by some other means.

At the time of the so-called upshift where the speed change gear is shifted from the driving condition at a large speed change ratio to that at a small speed change ratio, the rotating member at the engine side is connected through the friction engaging member, such as a friction clutch, friction brake, or the like, to the rotating member at the driven side which is rotating at a lower speed. In this case, the speed of the engine side rotating member should conform to the rotating speed of the driven side member in order to provide smooth speed shifting and reduce wear of the friction members of the friction engaging members. In automatic transmissions or semi-automatic transmissions, however, it is difficult to adapt speeds manually. The speeds should be automatically controlled by the hydraulic control system itself which performs oil supply or discharge for the hydraulic servos.

In order to discharge oil from the hydraulic servo of the friction engaging member forming the low speed range of large speed change ratio and to supply oil into the hydraulic servo of the friction engaging member forming the high speed range of small speed change ratio at the time of upshift, the prior art systems utilize one shift valve and perform the oil discharge from one hydraulic servo concurrently with the oil supply to other hydraulic servo. The hydraulic pressure in the hydraulic servo from which oil is discharged is rapidly decreased at the initial stage of discharge. On the other hand, the hydraulic pressure in the hydraulic servo receiving oil supply is not increased at the initial stage of supply due to the increase in the capacity of the hydraulic pressure chamber resulting from the movement of the servo piston, but is increased with a time delay. Therefore, the friction engaging member for low speed driving is released at an early stage and the engaging force of the friction engaging member for high speed driving does not reach a sufficient value at that time. Thus, the engine is brought into no-load condition and the acceleration conforming to the throttle opening at that time occurs. Consequently, the slip amount of the friction engaging member to be engaged is increased, and large shifting shocks are caused when the engaging force has reached a sufficient value.

If the increase in the hydraulic pressure in the hydraulic servo receiving oil supply is made rapidly before the decrease in the hydraulic pressure in the hydraulic servo from which oil is being discharged is started, the friction engaging member operated by the latter hydraulic servo causes friction loss which is useless for speed change, thus prolonging the shifting time and causing earlier wear of the friction members.

SUMMARY OF THE INVENTION

An object of this invention is to provide a hydraulic control system for transmissions wherein a speed change gear is upshifted from the low speed driving to the high speed driving by engaging one of two friction engaging members and releasing the other friction engaging member. This hydraulic control system is capable of providing an appropriate overlapping for slip driving of two friction engaging members, thus eliminating the shifting shocks or abnormal wear of the friction members and shortening the shifting time.

Another object of this invention is to provide a hydraulic control system capable of adjusting the overlap amount of slip driving of two friction engaging members in accordance with the engine output, thus smoothly changing the acceleration torque of the vehicle before and after speed change.

In transmissions comprising a variable ratio speed change gear, at least two friction engaging members and two hydraulic servos for operating each of the members, high speed range being obtained by supplying oil to the first hydraulic servo and discharging oil from the second hydraulic servo, and low speed range being obtained by discharging oil from the first hydraulic servo and supplying oil into the second hydraulic servo, the hydraulic control system for transmissions according to this invention comprises a shift valve, having a first position for supplying oil into the first hydraulic servo and discharging oil from the second hydraulic servo and a second position for discharging oil from the first hydraulic servo and supplying oil into the second hydraulic servo, and an orifice control valve which is placed in series with an oil passage connecting the shift valve and the second hydraulic servo and is adapted to increase the line resistance of such oil passage when the hydraulic pressure existing in the first hydraulic servo is lower than a set value but to decrease the line resistance when the hydraulic pressure exceeds such set value.

Moreover, according to this invention, an accumulator is controlled by a signal in relation to the engine output, by virtue of which the engaging force of the friction engaging member to be operated by the second hydraulic servo is not decreased instantaneously, and therefore a sufficiently large engaging force is maintained for a long period of time if the engine output is large.

Furthermore, according to this invention, the orifice control valve is controlled by the hydraulic pressure existing in the first hydraulic servo and a signal in relation with the engine output. Thus, the set value for actuation of the orifice control valve is increased with the increase in the signal in relation to the engine output, and the hydraulic pressure holding time of the second hydraulic servo at the time of oil discharge is prolonged.

DESCRIPTION OF A PREFERRED EMBODIMENT

Figure 1:
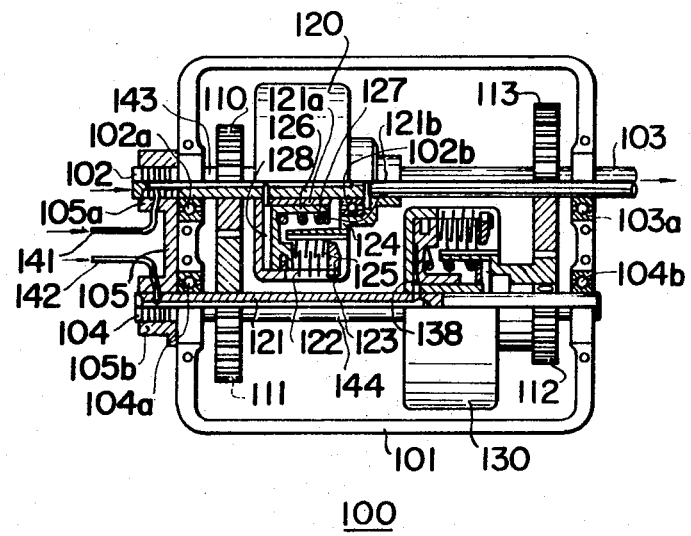
FIG. 1 is a sectional view of an example of speed change gear to which the system according to this invention is applied.

Illustrated in FIG. 1 is an example of speed change gear to which the hydraulic control system according to this invention is applied. This speed change gear is a two-speed counter shaft type. The speed change gear box 100 comprises a gear case 101, an input shaft 102 and an output shaft 103 which are coaxially disposed, an intermediate shaft 104 disposed in parallel with these shafts, gears 110, 111, 112 and 113 and multiple disc clutches 120 and 130 provided with hydraulic servos. The shafts 102 and 103 are coaxially and rotatably coupled by means of a bearing 102b at their adjacent inner ends. The outer ends thereof are supported on the case 101 by bearings 102a and 103a. The shaft 104 is supported on the case 101 at opposite ends thereof by means of bearings 104a and 104b.

The gears 110, 111 and 113 are firmly connected to the shafts 102, 104 and 103, respectively. The gear 112 is rotatably supported with respect to the shaft 104. The clutch 120 connects the shafts 102 and 103 and the clutch 130 connects the shaft 104 and the gear 112.

The clutches 120 and 130 are of known construction. Firstly, the clutch 120 will be described. The clutch 120 consists of a drum 121, clutch discs 122 connected to the drum, a clutch end plate 123, a hub 124, clutch discs 125 connected to the hub and interleaved clutch discs 122, a circular piston 126 disposed between the inner periphery of the drum 121 and the outer periphery of a drum boss 121a, a spring 127 whose one end is in contact with a stop seat 121b secured to the tip of the drum boss 121a and whose other end pushes the piston 126, and a cylinder chamber 128 formed by the drum 121 and the piston 126. The clutch 130 is of the same construction as described above. The cylinder chamber thereof is identified by the reference numeral 138. In order to supply oil into or discharge it from cylinder chambers 128 and 138, oil pipes 141 and 142 are attached to bosses 105a and 105b of a seat plate 105 disposed at the end plane of the case 101. Axial oil passages 143 and 144 are provided on the shafts 102 and 104.

As is seen from this construction, the input shaft 102 is coupled to the output shaft 103 through the gear 110 or 113 by discharging oil from the cylinder chamber 128 and supplying oil into the cylinder chamber 138, thus obtaining the low speed range having a certain speed ratio. If the oil is supplied into the cylinder chamber 128 while the oil is being discharged from the cylinder chamber 138, the input shaft 102 is directly coupled to the output shaft 103, thus obtaining the high speed range. Shift from low speed to high speed is called upshift and shift from high speed to low speed is called downshift.

Figure 5:
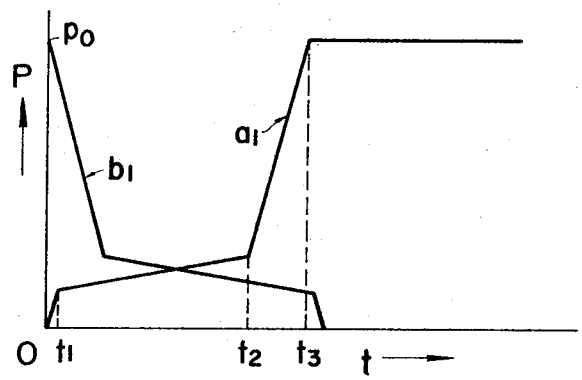
FIG. 5 is a graph showing the time variation of the hydraulic pressure in conventional systems.

In conventional speed change gears of the type described above, the oil supply to the cylinder chamber 128 is performed concurrently with the oil discharge from the cylinder chamber 138 at the time of upshift. In this case, the hydraulic pressure in the cylinder chamber 128 is changed as shown by the curve $a_1$ in FIG. 5. This hydraulic pressure is not immediately increased due to the line resistance in the oil passage and the increase in the capacity of the cylinder chamber even if the hydraulic control pressure having the pressure Po is supplied. During the period of time between zero and $t_1$, the pressure oil flows into the cylinder chamber 128 whose capacity is at the minimum at that time, thus increasing the pressure gradually. When the oil pressure exceeds the pressure applied by the spring 127 at the time $t_1$, the piston 126 is pushed to enlarge the cylinder chamber 128. At this time, the pressure is increased with a gentle gradient. When the piston 126 starts to press the clutch discs 122 and 125 against the end plate 123 at the time $t_2$, the piston 126 is not moved any more and the pressure is suddenly increased until the time $t_3$ and reaches the pressure Po of the hydraulic control pressure.

On the other hand, in the cylinder chamber 138 of the clutch 130 to which the hydraulic pressure Po is being supplied, the oil is discharged from the time zero with a characteristic shown by the curve $b_1$. The hydraulic pressure in this chamber is decreased in the reverse relationship with respect to the hydraulic characteristic of the cylinder chamber 128 to which oil is supplied. Consequently, the hydraulic pressure in the cylinder chamber 138 decreases to a small value before the hydraulic pressure in the cylinder chamber 128 is fully increased, during which time the engaging force of both clutches is small. As a result, the engine is brought into no-load condition and the rotating speed increases. Consequently, when the input shaft 102 is to be directly coupled with the output shaft 103 as the result of increase in the engaging force of the clutch 120, the difference in the speeds of both shafts is great, thus resulting in shifting shocks.

In order to eliminate the above-described shortcomings, the hydraulic pressure decrease rate at the clutch 130 should be small at the initial stage and the hydraulic pressure at clutch 130 should be decreased at a greater rate when the hydraulic pressure at the clutch 120 is fully increased. Thus, two clutches should form a range where they provide slip driving with a large engaging force.

Figure 2:
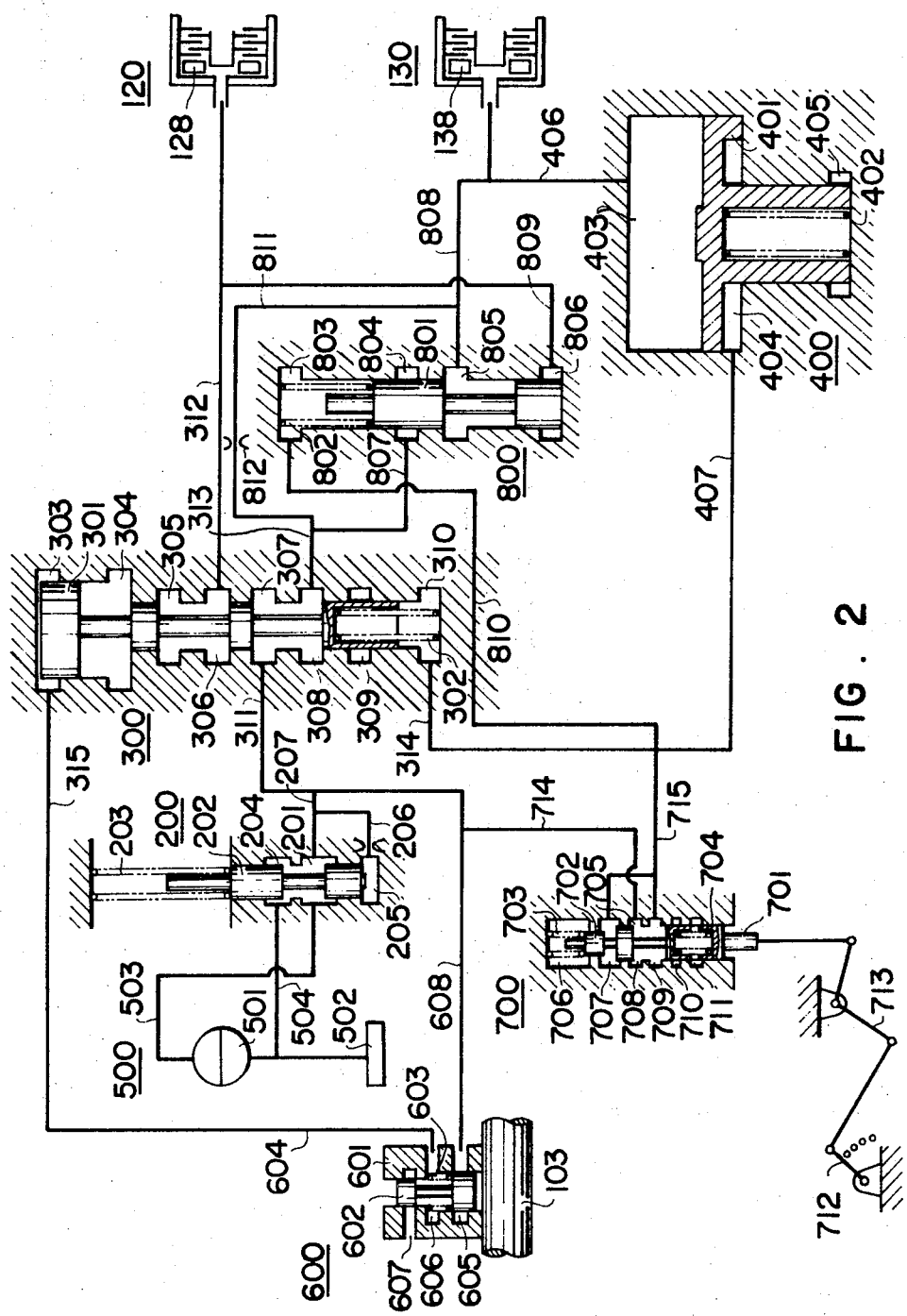
FIG. 2 is a piping diagram for the hydraulic control system according to this invention.

Illustrated in FIG. 2 is the hydraulic control system according to this invention, which is designed to attain the above requirement. This hydraulic control system consists of a hydraulic pressure source 500, a pressure regulator valve 200, a governor valve 600, a throttle valve 700, a shift valve 300, an accumulator 400 and an orifice control valve 800. The hydraulic pressure source 500 comprises an oil pump 501, an oil tank 502, a supply pipe 503 and an oil discharge, or return or exhaust, pipe 504. The hydraulic pressure developed in the supply pipe 503 is converted to a constant hydraulic control pressure by means of the pressure regulator valve 200.

The pressure regulator valve 200 consists of oil chambers 201 and 205, a valve body 202, a pressure adjusting spring 203, an oil discharging chamber 204 and a communication oil passage 206. The hydraulic pressure in the oil chamber 201 is controlled so that the upward hydraulic pressure acting on the valve body 202 in the oil chamber 205 is balanced with the force of the spring 203. The hydraulic control pressure regulated to a predetermined pressure is obtained in an output oil passage 207. This hydraulic control pressure is directed to each valve through oil passages 311, 408 and 714.

The governor valve 600 consists of a valve casing 601 which rotates integrally with the output shaft 103, a valve body 602 which is moved in the radial direction by centrifugal force, a bias spring 603, oil chambers 605 and 606 and an oil discharge or exhaust chamber 607. The hydraulic control pressure directed from an oil passage 608 into the oil chamber 605 is converted to a hydraulic pressure proportional to the angular velocity of the output shaft 103 or the vehicle velocity (to be referred to as "governor pressure" hereinafter) by means of the governor valve 600. This governor pressure is obtained at the output oil passage 604.

The throttle valve 700 consists of a plug 701, a valve body 702, a bias spring 703, a change spring 704, a communication oil passage 705 and oil chambers 706 and 711. The plug 701 is moved by an accelerator pedal 712 through a linkage 713. In the valve body 702, the sum of the downward force in an oil chamber 707 and the force of the spring 703 is opposed to the force of the spring 704 compressed by the plug 701. Thus, the valve body 702 is moved so that both forces become equal. The hydraulic pressure proportional to the throttle opening or engine output (to be referred to as "throttle pressure" hereinafter) is obtained at the output oil passage 715.

The shift valve 300 is designed to direct the hydraulic control pressure of the oil passage 311 to either of oil passages 312 and 313 and to discharge oil from other oil passage, thus alternately performing oil supply and oil discharge for the cylinder chambers 128 and 138 of the clutches 120 and 130. The shift valve 300 consists of a valve body 301, a bias spring 302, oil chambers 303, 306, 307, 308 and 310 and oil discharging or exhaust chambers 304, 305 and 309. The governor pressure is directed through an oil passage 315 into the oil chamber 303, and the throttle pressure is directed through an oil passage 314 into the oil chamber 310.

The orifice control valve 800 consists of a valve body 801, a bias spring 802, oil chambers 803, 804, 805 and 806, a branch oil passage 811 and an orifice 812 placed in oil passage 811. One end of the branch oil passage 811 is connected to the oil passage 313 (FIGS. 3 and 4) and other end thereof is connected through an oil passage 808 to the cylinder chamber 138 of the clutch 130. The oil chamber 804 is connected through an oil passage 807 to the oil passage 313 and the oil chamber 805 is connected to the oil passage 808. The throttle pressure is directed through an oil passage 810 into the oil chamber 803, and the hydraulic pressure in the cylinder chamber 128 of the clutch 120 is directed through an oil passage 809 into the oil chamber 806.

The accumulator 400 consists of a valve body 401, bias spring 402, oil chambers 403 and 404 and an oil discharging or exhaust chamber 405. The oil chamber 403 is connected in series with the cylinder chamber 138 of the clutch 130 through an oil passage 406. The throttle pressure is directed through an oil chamber 404. 407 into the oil chamber 404.

In FIG. 2, when the force developed by the governor pressure in the oil chamber 303 of the shift valve 300 for pushing the valve body 301 downward is smaller than the sum of the force of the spring 302 and the force developed by the throttle pressure in the oil chamber 310 for pushing the valve body upward, the valve body 301 is in the upper position as illustrated in FIG. 2, and the oil chamber 307 is communication with the oil chamber 308 while the oil chamber 306 is in communication with the oil discharging or exhaust chamber 305. Consequently, the hydraulic control pressure of the oil passage 311 flows through the oil passage 313, the orifice 812 and the oil passages 811 and 808 into the cylinder chamber 138 of the clutch 130. The oil in the cylinder chamber 128 of the clutch 120 is discharged through the oil passage 312. When the clutch 120 is released and the clutch 130 is engaged, the speed change gear 100 shown in FIG. 1 is being operated in the low speed range. Under this condition, no hydraulic pressure exists in the oil chamber 806 of the orifice control valve 800, and the valve body 801 is receiving only the downward pushing force developed by the spring 802 and the throttle pressure in the oil chamber 803. Therefore, the valve body 801 is in the lower position as illustrated, thus shutting off the communication between the oil chambers 804 and 805. The hydraulic control pressure is being directed into the oil chamber 403 of the accumulator 400. Since the force due to the hydraulic control pressure is larger than the force developed by the spring 402 and the throttle pressure in the oil chamber 404, the valve body 401 is pushed downward.

Figure 3:
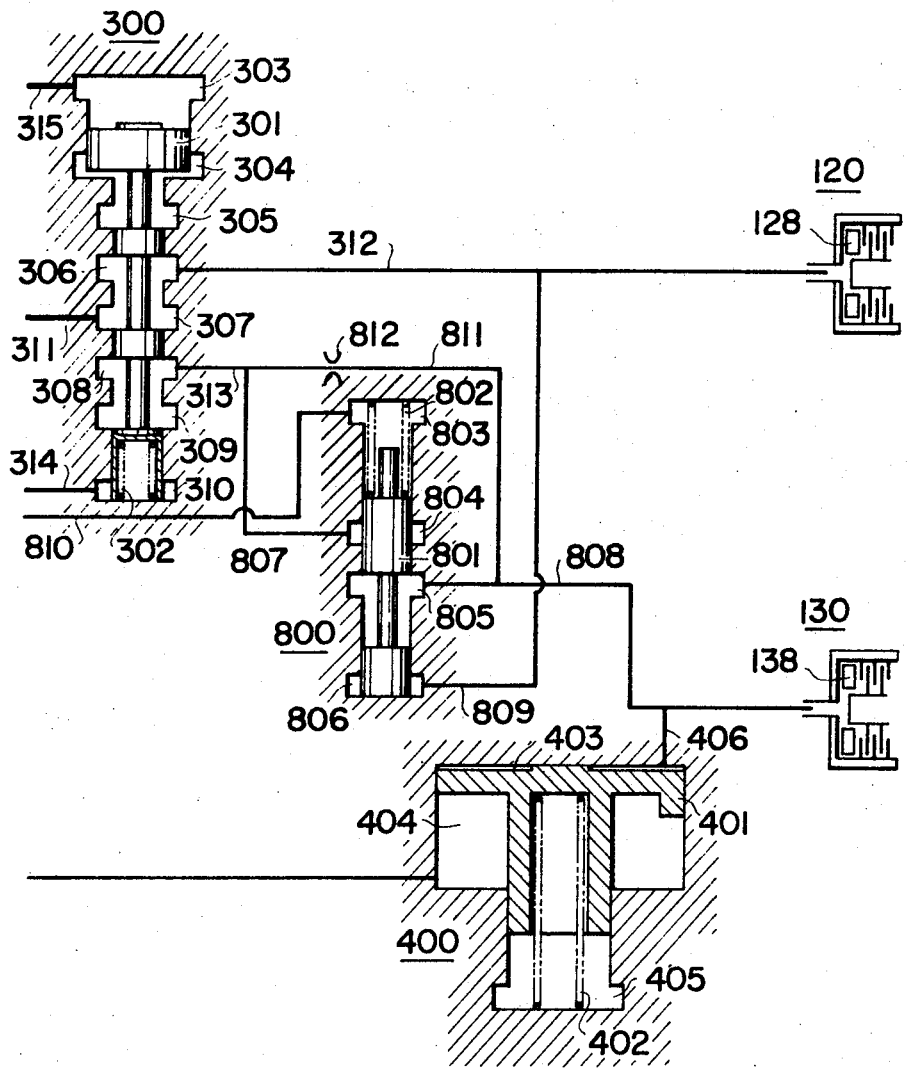
FIGS. 3 and 4 are piping diagrams for the principal parts of the system of FIG. 2 when they are in different operating positions.

When the force developed by the governor pressure in the oil chamber 303 of the shift valve 300 becomes larger than the force developed by the spring 302 and the throttle pressure in the oil chamber 310, the valve body 301 is pushed downward as illustrated in FIG. 3. The oil chamber 306 is brought into communication with the oil chamber 307, thus directing the hydraulic control pressure into the cylinder chamber 128 of the clutch 120. At the same time, the oil chamber 308 is brought into communication with the oil discharging or exhaust chamber 309, thus discharging oil from the cylinder chamber 138 of the clutch 130.

Figure 6:
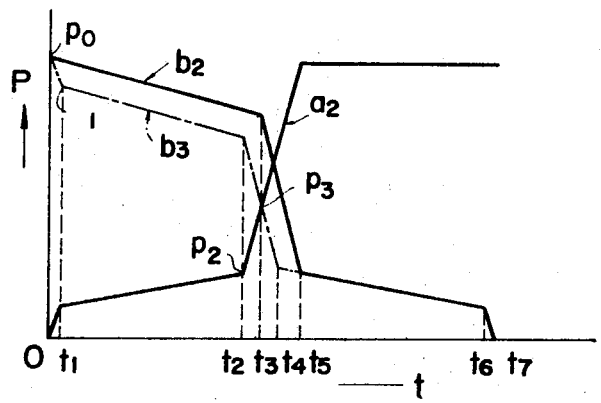
FIGS. 6 and 7 are graphs showing the time variations of the hydraulic pressures in the hydraulic servos which are obtained by the system of FIG. 2.

The changes in the hydraulic pressures in each cylinder chamber in the above described case are shown in FIG. 6. The hydraulic pressure in the cylinder chamber 128 into which oil is being supplied is increased along the curve $a_2$ which is of the same form as described with reference to FIG. 5. On the other hand, the hydraulic pressure in the cylinder chamber 138 decreases along the curve $b_2$ if the throttle pressure is high. If the throttle pressure is low, this hydraulic pressure is changed as shown by the curve $b_3$. Now, the curve $b_3$ will be described. As the hydraulic pressure to be applied to the oil chamber 806 of the orifice control valve 800 is not fully increased at the initial stage, the valve body 801 is in the lower position, thereby shutting off the communication between the oil chambers 804 and 805. The valve body 401 of the accumulator 400 is in the lower position as shown in FIG. 2, thus accumulating the hydraulic pressure in the oil chamber 403.

Figure 4:
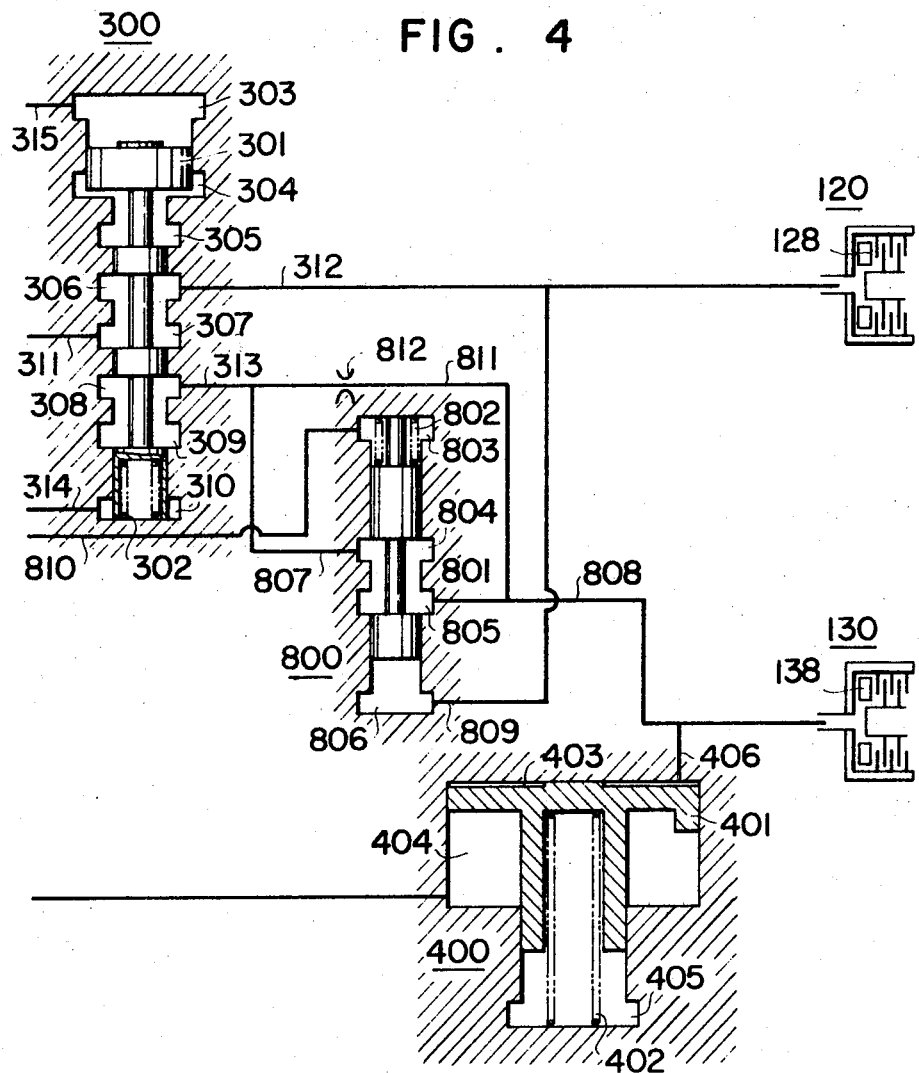

During the period from the time zero to the time $t_1$, the hydraulic pressure in the cylinder chamber 138 is discharged through the oil passages 808 and 811, the orifice 812 and the circuit 313. When this hydraulic pressure reaches the pressure $P_1$ at the time $t_1$, the upward force developed by the spring 402 and the throttle pressure in the oil chamber 404 becomes larger than the downward force in the oil chamber 403 of the accumulator 400. Thus, the hydraulic pressure in the oil chamber 403 is discharged through the above mentioned route, while moving the valve body 401 upward. The decrease rate of the hydraulic pressure at this time is held low by means of the orifice 812. This low rate continues until the time $t_2$. When the hydraulic pressure in the oil chamber 806 of the orifice control valve 800 reaches the pressure $P_2$ on the curve $a_2$ at the time $t_2$, the valve body 801 thereof is moved upward as shown in FIG. 4, thus bringing the oil passage 804 into communication with the oil passage 805. As a result, the orifice 812 is bypassed, and the hydraulic pressure in the oil chamber 403 of the accumulator 400 is discharged through a route having a smaller line resistance, that is, through the oil chambers 805 and 804 and the oil passage 807. Therefore, the hydraulic pressure is decreased with a comparatively high decrease rate until the time $t_4$. The valve body 401 of the accumulator 400 reaches the upper position at the time $t_4$ and the capacity of the cylinder chamber 138 of the clutch 130 decreases, as a result of which the oil is discharged with a low decrease rate. When the movement of the piston of the clutch 130 is stopped at the time $t_6$, the hydraulic pressure rapidly decreases until the time $t_7$.

If the throttle pressure is high and the upward force applied to the valve body 401 of the accumulator 400 shown in FIG. 2 is proportioned with the downward force applied onto valve body 401, the hydraulic pressure in the cylinder chamber 138 is changed as shown by the curve $b_2$ in FIG. 6. That is, the oil is discharged from the accumulator 400 from the beginning and the hydraulic pressure is decreased while maintaining a higher pressure than the curve $b_3$. Since the throttle pressure applied to the oil chamber 803 is high, the operation point of the orifice control valve 800 is delayed until the hydraulic pressure in the oil chamber 806 reaches the pressure $P_3$ on the curve $a_2$. From this time on, the orifice 812 is bypassed by the valve 800 and the hydraulic pressure decreases with a high decrease rate until the time $t_5$. After that, the hydraulic pressure is changed in the same manner as the curve $b_3$.

According to the hydraulic control system of this invention, the hydraulic pressure of the clutch 130 from which oil is being discharged is maintained at a high value until the hydraulic pressure of the clutch 120 to which oil is being supplied is fully increased at the time of upshift. At the same time, the decrease in the hydraulic pressure in the clutch 130 is adjusted by the signal in relation to the throttle pressure, that is, the engine output. Therefore, smooth speed change is provided and abnormal wear of friction members or prolonged shifted time can be prevented.

Figure 7:
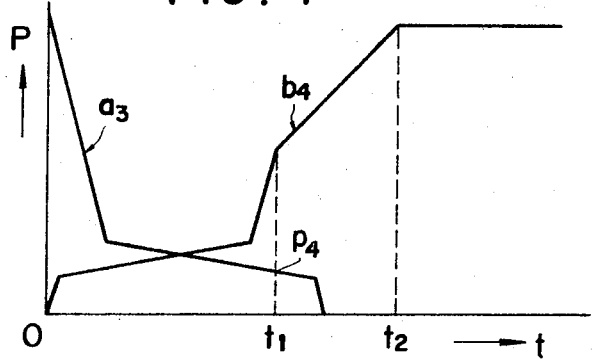

FIG. 7 illustrates the changes in the hydraulic pressure at the time of the so-called downshift where the condition of each valve shown in FIG. 4 is returned to the condition shown in FIG. 2. In this case, the hydraulic pressure in the cylinder chamber 128 of the clutch 120 is rapidly decreased at the initial stage as shown by the curve $a_3$. On the other hand, the hydraulic pressure in the cylinder chamber 138 of the clutch 130 increases along the curve $b_4$. When the hydraulic pressure in the oil chamber 806 of the orifice control valve is decreased as far as the pressure $P_4$ the curve $a_3$, the valve body 801 that has been bypassing the orifice 812 is moved downward, thus shutting off the communication between the oil passages 804 and 805. Consequently, the orifice 812 is situated in series with the oil passage between the cylinder chamber 138 of the clutch 130 and the oil chamber 403 of the accumulator 400, and the hydraulic pressure increases with a gentle gradient as shown between the time $t_1$ and the time $t_2$. As is apparent from FIG. 7, there exists a time zone where the hydraulic pressures in both cylinder chambers 128 and 138 of the clutches 120 and 130 are low and the engaging forces of clutches 120 and 130 are small, thus bringing the engine into no-load condition. Thus, the engine is accelerated to permit smooth downshifting. On the other hand, the engaging force of the clutch 130 is gradually increased at the later stage, and therefore speed change is performed more smoothly.

Figure 8:
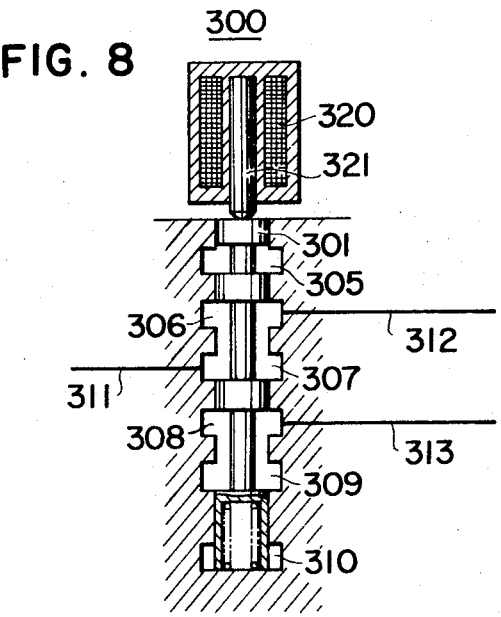
FIG. 8 is a sectional view of another embodiment of the shift valve.

As shown in FIG. 8, it is possible to operate the valve body 301 of the shift valve 300 by means of an electromagnetic solenoid 320 and an armature 321. In this case, the oil chambers 303 and 304 shown in FIG. 2 are omitted and the oil chamber 310 serves as an oil discharging or exhaust chamber. The electromagnetic solenoid 320 is supplied with the shifting signal calculated from a voltage proportional to the vehicle velocity and a voltage proportional to the engine output. Thus, solenoid 320 causes the valve body 301 to move upward or downward through the armature 321. In FIG. 8, parts corresponding to those in FIG. 2 are identified by the same reference numerals.

In the above-described embodiment, the hydraulic control system of this invention is applied to countershaft type two-speed change gears. It is apparent, however, that this system can be applied to three or more speed change gears or planetary change gears.

In the above-described embodiment, an accumulator is provided on an oil passage leading to a second hydraulic servo. However, even if the accumulator is eliminated, the effect of preventing rapid decrease of the hydraulic pressure in the second hydraulic servo at the time of upshift still can be attained, because the above-described orifice control valve obstructs the movement of the piston of the second hydraulic servo. However, it is expected that this effect is weakened if the accumulator is not provided. Further, the orifice control valve may be provided in a discharge port to be connected with the discharging chamber or exhaust of the shift valve.

What is claimed is:

1. In a transmission including a variable ratio speed change gear, at least two friction engaging members, respective hydraulic servos for operating the members, and a source of hydraulic fluid under pressure, with high speed range being obtained by supplying hydraulic fluid under pressure to a first hydraulic servo and exhausting hydraulic fluid from a second hydraulic servo, and low speed range being obtained by exhausting hydraulic fluid from the first hydraulic servo and supplying hydraulic fluid under pressure to the second hydraulic servo: a hydraulic control system for said transmission comprising, in combination, a shift valve connected between said source and said first and second hydraulic servos, and having a first position, connecting said first hydraulic servo to said source and said second hydraulic servo to exhaust, and a second position, connecting said first hydraulic servo to exhaust and said second hydraulic servo to said source; a first passage connecting said shift valve to said first hydraulic servo; a restricted flow second passage connecting said shift valve to said second hydraulic servo; said first and second passages serving for supply and exhaust of hydraulic fluid relative to the associated hydraulic servos; and an orifice control valve connected between said shift and said second hydraulic servo and having a first position connecting said shift valve directly to said second hydraulic servo in by-passing relation to said second passage and a second position in which said shift valve is connected to said second hydraulic servo only through said restricted flow second passage; and means operable to move said orifice control valve to its second position when the hydraulic pressure existing in said first hydraulic servo is lower than a said value, and to move said orifice control valve to its first position when the hydraulic pressure in said first hydraulic servo exceeds said set value.

2. The hydraulic control system for transmissions as defined in claim 1, wherein an accumulator for accumulating the hydraulic pressure existing in said second hydraulic servo is connected in series with said second hydraulic servo.

3. The hydraulic control system for transmissions as defined in claim 1, including an accumulator, for accumulating the hydraulic pressure existing in said second hydraulic servo, connected in series with said second hydraulic servo; and means operable responsive to the output of an engine connected to said transmission providing a signal controlling said accumulator.

4. The hydraulic control system for transmissions as defined in claim 1, including means applying the hydraulic pressure existing in said first hydraulic servo to said orifice control valve, and means operable responsive to the output of an engine connected to said transmission and providing a control signal to said orifice control valve.

5. The hydraulic control system for transmissions as defined in claim 1, including an orifice in said second passage providing a flow restriction therein; said orifice control valve being connected in by-passing relation with said orifice.

6. The hydraulic control system for transmissions as defined in claim 1, including solenoid means operable to effect control movements of said shift valve; and means energizing said solenoid with a voltage proportional to the velocity of a vehicle having said transmission and a voltage proportional to the output of an engine connected to said transmission.

* * * * *